(12) United States Patent
Hirano et al.

(10) Patent No.: US 9,977,473 B1
(45) Date of Patent: May 22, 2018

(54) DATA STORAGE SYSTEM ENCLOSURE WITH DECOUPLED DIVIDER

(71) Applicant: Western Digital Technologies, Inc., Irvine, CA (US)

(72) Inventors: Toshiki Hirano, San Jose, CA (US); Lidu Huang, Danville, CA (US); Jeffrey D. Wilke, Palmer Lake, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days. days.

(21) Appl. No.: 15/390,408

(22) Filed: Dec. 23, 2016

(51) Int. Cl.
*G06F 1/18* (2006.01)
*G06F 13/40* (2006.01)

(52) U.S. Cl.
CPC .............. *G06F 1/187* (2013.01); *G06F 1/181* (2013.01); *G06F 13/4068* (2013.01)

(58) Field of Classification Search
CPC ......... G06F 1/181; G06F 1/187; G06F 13/409
See application file for complete search history.

(56) References Cited

U.S. PATENT DOCUMENTS

| | | | | |
|---|---|---|---|---|
| 5,481,431 A | * | 1/1996 | Siahpolo | G06F 1/184 361/679.31 |
| 5,524,104 A | * | 6/1996 | Iwata | G11B 33/128 361/679.32 |
| 6,154,361 A | | 11/2000 | Anderson et al. | |
| 6,619,766 B1 | * | 9/2003 | Mansueto | G06F 1/184 312/223.1 |
| 7,039,299 B2 | * | 5/2006 | Onodera | G11B 33/128 360/133 |
| 7,187,541 B2 | * | 3/2007 | Franke | G06F 1/184 361/679.33 |
| 7,193,856 B2 | * | 3/2007 | Hidaka | G11B 33/126 211/190 |
| 7,200,008 B1 | * | 4/2007 | Bhugra | G11B 25/043 361/679.21 |
| 7,304,855 B1 | * | 12/2007 | Milligan | G11B 33/128 361/724 |
| 7,359,186 B2 | * | 4/2008 | Honda | G11B 27/00 361/679.33 |
| 7,423,883 B2 | | 9/2008 | Carlson et al. | |
| 7,505,264 B2 | | 3/2009 | Hall et al. | |
| 7,983,032 B2 | | 7/2011 | Walker et al. | |

(Continued)

OTHER PUBLICATIONS

Homas M. Ruwart et al., Performance Impact of External Vibration on Consumer-grade and Enterprise-class Disk Drives, IEEE Computer Society, 2005, 9 pages, Proceedings of the 22nd IEEE/13th NASA Goddard Conference on Mass Storage Systems and Technologies (MSST 2005), IEEE.

*Primary Examiner* — Adrian S Wilson
(74) *Attorney, Agent, or Firm* — John D. Henkhaus

(57) ABSTRACT

A decoupled partitioning divider for a data storage system enclosure includes a first leg having proximal and distal halves and a second leg having proximal and distal halves, and in which the first and second legs are coupled together at either the proximal or distal half and uncoupled from each other at the other of the proximal and distal halves, so that the divider legs are decoupled from each other at one half or one end. When installed in a data storage system enclosure between adjacent data storage devices, such as hard disk drives, vibration transfer among the devices housed therein may be inhibited.

13 Claims, 3 Drawing Sheets

(56) References Cited

U.S. PATENT DOCUMENTS

| | | |
|---|---|---|
| 8,300,400 B2 | 10/2012 | Sun |
| 8,477,496 B2 | 7/2013 | Zhang et al. |
| 8,508,928 B2 | 8/2013 | Killen et al. |
| 2003/0099094 A1* | 5/2003 | Coles .................. H05K 7/1409 361/726 |
| 2007/0230110 A1* | 10/2007 | Starr ...................... G11B 33/10 361/679.31 |
| 2007/0247802 A1* | 10/2007 | Imsand .................. G06F 1/181 361/679.39 |
| 2008/0298014 A1* | 12/2008 | Franco .................... G06F 1/183 361/688 |
| 2011/0069441 A1* | 3/2011 | Killen .................. G11B 33/124 361/679.33 |
| 2011/0085270 A1* | 4/2011 | Hirano ................. G11B 5/4826 360/245.2 |
| 2011/0096494 A1 | 4/2011 | Cochrane |
| 2011/0128696 A1* | 6/2011 | Weng .................... G11B 33/08 361/679.35 |
| 2011/0176271 A1* | 7/2011 | Zhang ...................... G06F 1/20 361/679.33 |
| 2011/0194242 A1* | 8/2011 | Hu ...................... H05K 7/1487 361/679.32 |
| 2011/0222234 A1* | 9/2011 | Davis .................. G11B 33/128 361/679.33 |
| 2014/0209548 A1 | 7/2014 | Lo et al. |
| 2015/0359115 A1* | 12/2015 | Hirano .................... G06F 1/181 361/679.34 |
| 2015/0380059 A1 | 12/2015 | Bell et al. |

\* cited by examiner

COUPLE MULTIPLE PARTITIONING DIVIDERS BETWEEN OPPOSING ENCLOSURE PANELS TO FORM PARTITIONS BETWEEN ADJACENT PARTITIONING DIVIDERS, WHEREIN EACH SAID PARTITIONING DIVIDER COMPRISES:

A FIRST LEG HAVING A PROXIMAL HALF AND A DISTAL HALF, AND

A SECOND LEG HAVING A PROXIMAL HALF AND A DISTAL HALF, AND MECHANICALLY COUPLED WITH THE FIRST LEG AT THE DISTAL HALF AND MECHANICALLY UNCOUPLED FROM THE FIRST LEG AT THE PROXIMAL HALF
302

MOUNT AT LEAST ONE DATA STORAGE DEVICE IN EACH OF ONE OR MORE OF THE PARTITIONS, INCLUDING COUPLING A DATA STORAGE DEVICE TO A PROXIMAL END OF EACH OF THE FIRST AND SECOND LEGS OF THE PARTITIONING DIVIDER
304

FIG. 3

DATA STORAGE SYSTEM ENCLOSURE WITH DECOUPLED DIVIDER

FIELD OF EMBODIMENTS

Embodiments of the invention may relate generally to data storage systems and more particularly to data storage system enclosures.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head uses a magnetic field to read data from and write data to the surface of a magnetic-recording disk. A write head makes use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

There is a commercial demand for digital data storage systems, in which multiple hard disk drives (HDDs) are housed in a common enclosure. Data storage systems often include shelves, or "sleds", on which one or more rows of HDDs are mounted. As such, a given HDD may have an adjacent neighbor HDD arranged in close position thereto, in either a side-by-side and/or an over-under type of arrangement. In operation, such as when an HDD is actively seeking, a voice-coil motor (VCM) generates torque in moving a head-stack assembly (HSA) over the disk stack. In turn, this VCM torque may be transferred to the structure to which the HDD is mounted, whereby force and/or motion may be transferred to neighbor HDDs. Hence, each HDD may experience positioning errors as a result of such mechanical cross-coupling.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are directed toward a "decoupled" partitioning divider for a data storage system enclosure, including a first leg having proximal and distal halves and a second leg having proximal and distal halves, and where the first and second legs are coupled together at either the proximal or distal half and uncoupled from each other at the other of the proximal and distal halves. That is, the divider legs are decoupled from each other at one half, or end. Hence, when installed in a data storage system enclosure between adjacent data storage devices, such as hard disk drives, vibration transfer among the devices housed therein, such as due to mechanical cross-coupling, may be inhibited by use of such dividers.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 3 is a flow diagram illustrating a method for inhibiting mechanical cross-coupling among neighbor devices, according to an embodiment.

DETAILED DESCRIPTION

Approaches to a data storage system partitioning divider are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Introduction

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

As discussed, data storage systems often include "sleds" on which multiple HDDs are mounted and which, in operation, transfer force and/or motion to neighbor HDDs. Consequently, each HDD may experience positioning errors as a result of such mechanical cross-coupling among neighbor HDDs mounted along each sled.

Data Storage System Enclosure Divider

Figure 1:
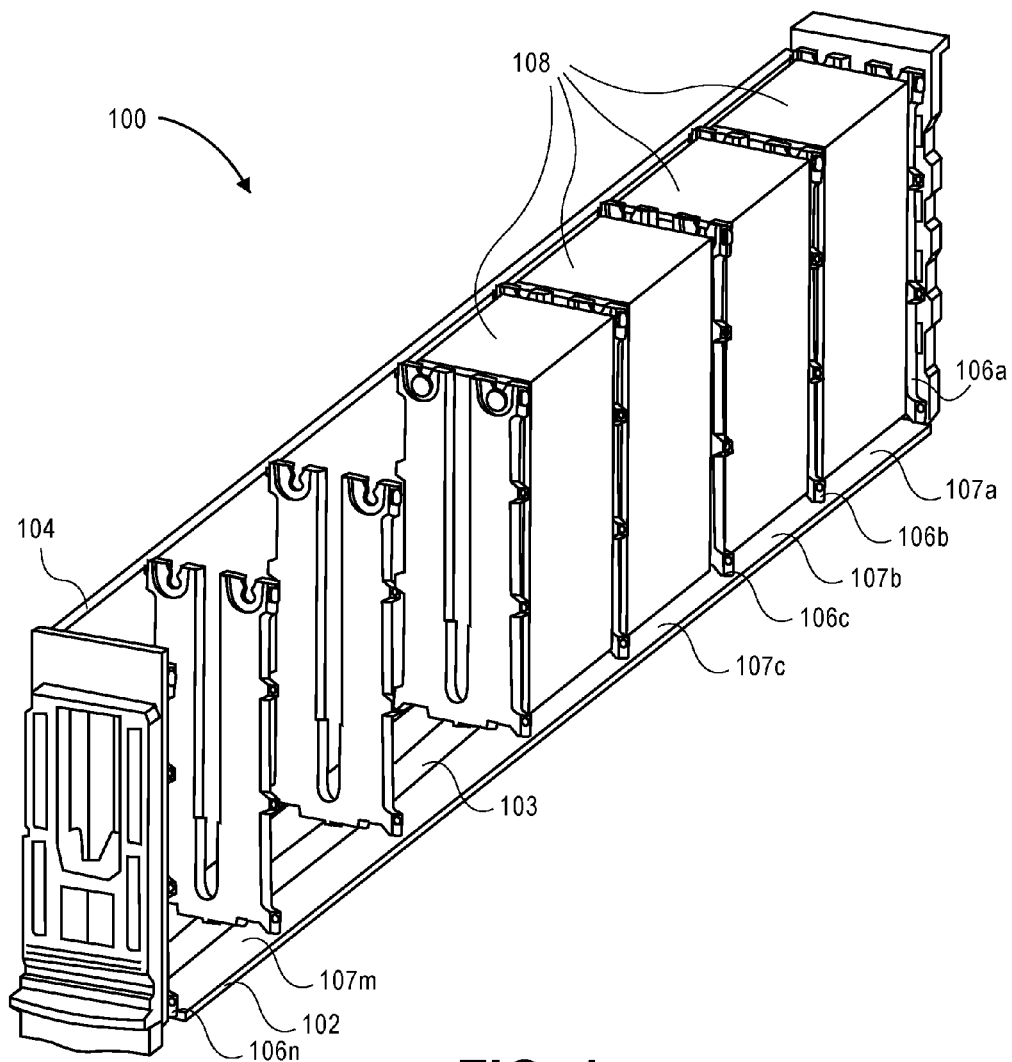
FIG. 1 is a perspective view illustrating a data storage system enclosure assembly, according to an embodiment.

FIG. 1 is a perspective view illustrating a data storage system enclosure assembly, according to an embodiment. Enclosure assembly 100 (also referred to as a "sled") is a box structure/enclosure for housing/mounting a plurality of data storage devices, such as high-capacity hard disk drives (HDDs). Enclosure assembly 100 is enclosed by a number of panels to form the box structure, some of which are removed in FIG. 1 in order to illustrate what structure may be positioned within the enclosure assembly 100.

According to an embodiment, enclosure assembly 100 comprises a first panel 102 that houses one or more circuits 103, such as in the form of one or more printed circuit boards (PCBs). Enclosure assembly comprises a second panel 104 and an opposing third panel (removed), which extend normal to the first panel 102. For example, if second panel 104 is a back panel then the third panel would be an opposing front panel, or if the second panel is a top panel then the third panel would be an opposing bottom panel, depending on the positioning of the enclosure assembly 100 within a data storage system rack.

Enclosure assembly 100 further comprises a plurality of partitioning dividers 106a-106n (or "enclosure divider", "mounting divider", or simply "divider"; and generally, "partitioning divider 106"), where n represents a number that may vary from implementation to implementation, that partition the enclosure assembly 100 into a number of partitions 107a-107m (e.g., n−1). Each partition 107a-107m is for housing at least one data storage device 108, such as a hard disk drive (HDD). Enclosure assembly 100 is illustrated with some partitions 107a-107m loaded with a respective data storage device 108 and some partitions 107a-107m left unloaded or empty, for purposes of example and clarity to illustrate internal structure within the enclosure assembly 100.

Figure 2:
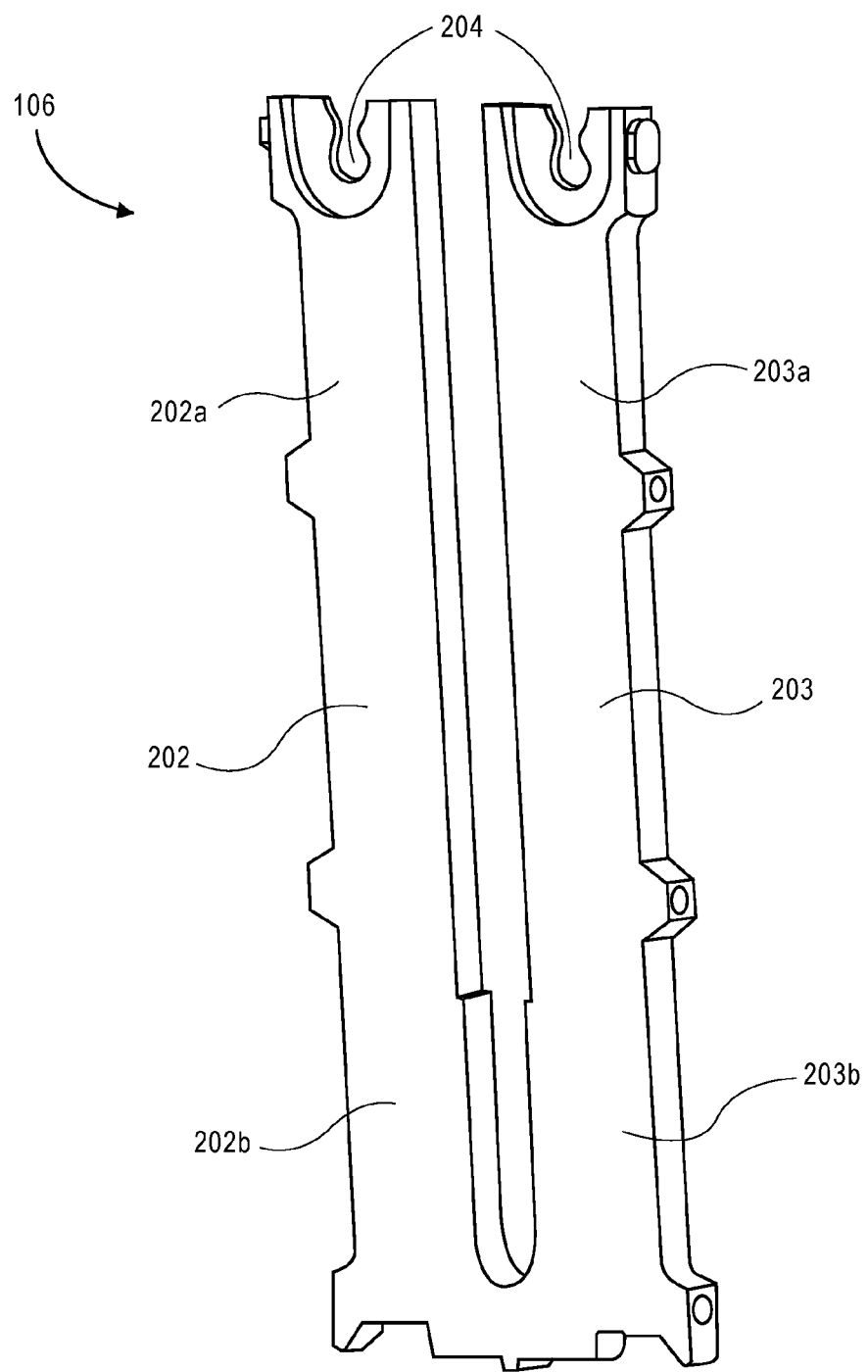
FIG. 2 is a perspective view illustrating a data storage system enclosure divider, according to an embodiment.

FIG. 2 is a perspective view illustrating a data storage system enclosure divider, according to an embodiment. According to an embodiment, each partitioning divider 106a-106n comprises a first leg 202 having a proximal half 202a and a distal half 202b, and a second leg 203 having a proximal half 203a and a distal half 203b. The first leg 202 and the second leg 203 are mechanically coupled together at one of the proximal half 202a, 203a or the distal half 202b, 203b, and mechanically uncoupled from each other at the other of the proximal half 202a, 203a and distal half 202b, 203b. As such, the first leg 202 and the second leg 203 are decoupled from each other at one half, or at one end. Hence, when installed in a data storage system enclosure (e.g., data storage system enclosure assembly 100 of FIG. 1) between adjacent (i.e., neighbor) data storage devices (e.g., data storage devices 108 of FIG. 1), vibration transfer among the devices housed therein (e.g., due to mechanical cross-coupling) is likely to be inhibited by the partial decoupling of first and second legs 202, 203.

According to an embodiment, and as depicted in FIG. 2, the first leg 202 and the second leg 203 are coupled together only at each distal half 202b, 203b. While the coupling between the first leg 202 and the second leg 203 is depicted as at the bottom of each distal half 202b, 203b, such mechanical coupling may be positioned at other locations within the distal half. In a scenario in which the first and second legs 202, 203 are coupled at each distal half 202b, 203b, according to an embodiment, each of the first and second legs 202, 203 comprises a mounting feature 204 at the proximal end, i.e., at the end of the proximal half 202a, 203a. For example, and according to an embodiment, a single high-capacity HDD may be mounted to both the first leg 202 and the second leg 203 of divider 106 via respective mounting features 204. However, mounting a pair of HDDs to the divider 106, i.e., one HDD mounted to mounting feature 204 of the first leg 202 and another HDD mounted to mounting feature 203 of the second leg 203, is contemplated. Further, and according to an embodiment, the divider 106 may be adapted such that the first leg 202 and the second leg 203 are coupled together only at the proximal half 202a, 203a (rather than at the distal half 202b, 203b) and uncoupled at the distal half 202b, 203b.

For a non-limiting example, the partitioning divider 106 may be fabricated from, and thus composed of, a thermoplastic material. Referring back to FIG. 1, such partitioning dividers 106a-106n may be installed/coupled with the first panel 102 (e.g., a metal sheet) using a thermoplastic affixing process. For example, plastic rivet-type fasteners may be positioned through respective mounting holes of the second and third panels and press-fit into respective mounting features of the first and second legs 202, 203, and then heated for thermoplastic setting among the parts.

Method for Inhibiting Mechanical Cross-Coupling Among Neighbor Devices

FIG. 3 is a flow diagram illustrating a method for inhibiting mechanical cross-coupling among neighbor devices, according to an embodiment. An example use includes inhibiting mechanical cross-coupling among neighbor hard disk drives (see, e.g., data storage devices 108 of FIG. 1) housed in a data storage device system enclosure (see, e.g., enclosure assembly 100 of FIG. 1).

At block 302, multiple partitioning dividers are coupled between opposing enclosure panels to form partitions between adjacent dividers. For example and as described elsewhere herein, each divider 106 (FIGS. 1, 2) comprises a first leg 202 (FIG. 2) having a proximal half 202a (FIG. 2) and a distal half 202b (FIG. 2) and a second leg 203 having a proximal half 203a (FIG. 2) and a distal half 203b (FIG. 2), where the first and second legs 202, 203 are mechanically, physically, structurally coupled together at each distal half 202b, 203b while mechanically uncoupled at each proximal half 202a, 203a. Each divider 106 may be coupled to the second panel 104 and third panel described in reference to FIG. 1.

At block 304, at least one data storage device is mounted in each of one or more of the partitions. For example, at least one data storage device 108 (FIG. 1) is mounted in each of one or more partitions 107a-107m (FIG. 1) of enclosure assembly 100 (FIG. 1). Thus, vibration transfer among the data storage devices 108 housed in enclosure assembly 100 (e.g., due to mechanical cross-coupling) is inhibited because of the partial decoupling, or separation, of the first and second legs 202, 203 (FIG. 2) of the divider 106 (FIGS. 1, 2). Stated otherwise, the vibration transfer among lateral neighbor devices (in a side-by-side arrangement) is inhibited. According to an embodiment, mounting a single data storage device 108 in a partition 107a-107m includes coupling the data storage device 108 to a proximal end of each of the first and second legs 202, 203 of the divider 106, such as at mounting feature 204 (FIG. 2).

In a scenario in which two data storage devices are housed in a partition 107a-107m, such as in an over-under type of arrangement, mounting a data storage device 108 in a partition 107a-107m includes coupling the data storage device 108 to a proximal end of at least one of the first and second legs 202, 203 of the divider 106, such as at mounting feature 204 (FIG. 2). Thus, the vibration transfer among neighbor devices in both directions (side-by-side and over-under) is inhibited.

According to an embodiment, a further action that may be associated with the foregoing method for inhibiting mechanical cross-coupling among neighbor devices involves electrically connecting the data storage device with a circuit board coupled to the data storage system enclosure. For example, a data storage device 108 (FIG. 1) is electrically connected with the circuit 103 (FIG. 1) (e.g., a PCB) coupled with the first panel 102 (FIG. 1) of enclosure assembly 100.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A data storage system enclosure divider for dividing adjacent data storage devices, comprising:
   a first leg extending along a plane and having a proximal half and a distal half and an inner side and an outer side, said outer side having one or more mounting features extending therefrom for receiving a fastener; and
   a second leg extending along said plane and having a proximal half and a distal half and an inner side and an outer side, said outer side having one or more mounting features extending therefrom for receiving a fastener;
   wherein said first and second legs are coupled together in said plane at one of said proximal and distal halves and uncoupled from each other at the other of said proximal and distal halves.

2. The divider of claim 1, wherein said first and second legs are coupled together only at said distal half.

3. The divider of claim 2, wherein each said first and second leg comprises a mounting feature at a proximal end.

4. The divider of claim 1, wherein said first and second legs are coupled together only at said proximal half.

5. A data storage system enclosure assembly for mounting adjacent data storage devices side-by-side, the enclosure assembly comprising:
   a first panel housing one or more circuit boards;
   a plurality of partitioning dividers partitioning said assembly into partitions each for housing at least one data storage device, wherein each said partitioning divider comprises:
      a first leg having a proximal half and a distal half, and
      a second leg having a proximal half and a distal half, and mechanically coupled with said first leg at one of said proximal and distal halves and mechanically uncoupled from said first leg at the other of said proximal and distal halves; and
   second and third enclosure panels extending normal to said first panel on opposing sides of said partitioning dividers.

6. The enclosure assembly of claim 5, wherein said first and second legs of said partitioning divider are coupled together only at said distal half.

7. The enclosure assembly of claim 6, wherein each said first and second leg of said partitioning divider comprises a mounting feature at a proximal end.

8. The enclosure assembly of claim 5, wherein said first and second legs of said partitioning divider are coupled together only at said proximal half.

9. A method for inhibiting mechanical cross-coupling among neighbor data storage devices housed in a data storage system enclosure, the method comprising:
   coupling multiple partitioning dividers with and between opposing enclosure panels to form respective partitions between adjacent partitioning dividers, wherein each said partitioning divider comprises:
      a first leg having a proximal half and a distal half, and
      a second leg having a proximal half and a distal half, and mechanically coupled with said first leg at said distal half and mechanically uncoupled from said first leg at said proximal half; and
   mounting at least one data storage device in each of one or more of said partitions.

10. The method of claim 9, further comprising:
    electrically connecting said data storage device with a circuit board coupled to said enclosure.

11. The method of claim 10, wherein mounting said data storage device includes coupling said data storage device to a proximal end of at least one of said first and second legs of at least one said partitioning divider.

12. The method of claim 10, wherein mounting said data storage device includes coupling said data storage device to a proximal end of each of said first and second legs of at least one said partitioning divider.

13. The divider of claim 1, composed of a thermoplastic material.

* * * * *